(12) United States Patent
Young (10) Patent No.: US 12,523,330 B2
(45) Date of Patent: *Jan. 13, 2026

(54) BLADDER SURGE SUPPRESSOR

(71) Applicant: Young Engineering & Manufacturing, Inc., San Dimas, CA (US)

(72) Inventor: Winston B. Young, Sierra Madre, CA (US)

(73) Assignee: Young Engineering & Manufacturing, Inc., San Dimas, CA (US)

( * ) Notice: Subject to any disclaimer, the term of this patent is extended or adjusted under 35 U.S.C. 154(b) by 23 days.

This patent is subject to a terminal disclaimer.

(21) Appl. No.: 17/752,775

(22) Filed: May 24, 2022

(65) Prior Publication Data

US 2023/0050427 A1 Feb. 16, 2023

Related U.S. Application Data

(63) Continuation of application No. 15/990,529, filed on May 25, 2018, now Pat. No. 11,339,907, which is a
(Continued)

(51) Int. Cl.
| | |
|---|---|
| *F17C 1/02* | (2006.01) |
| *F15B 1/16* | (2006.01) |
| *F16L 55/053* | (2006.01) |

(52) U.S. Cl.
CPC ............ *F16L 55/053* (2013.01); *F15B 1/165* (2013.01); *F15B 2201/3152* (2013.01);
(Continued)

(58) Field of Classification Search
CPC .............. F15B 1/165; F15B 2201/3152; F15B 2201/615; F15B 2201/4155;
(Continued)

(56) References Cited

U.S. PATENT DOCUMENTS

| | | | | |
|---|---|---|---|---|
| 2,390,319 | A | | 12/1945 | Overbeke |
| 3,348,728 | A | * | 10/1967 | Love ....................... F15B 1/165 |
| | | | | 220/62.21 |

(Continued)

FOREIGN PATENT DOCUMENTS

WO 2015095897 A1 6/2015

OTHER PUBLICATIONS

Written Opinion of the International Searching Authority dated May 18, 2015 in corresponding International Application No. PCT/US2015/014907 filed Feb. 6, 2015; total 7 pages.
International Search Report dated May 18, 2015 in corresponding International Application No. PCT/US2015/014907 filed Feb. 6, 2015; total 2 pages.

(Continued)

*Primary Examiner* — Stephen J Castellano
(74) *Attorney, Agent, or Firm* — Snell & Wilmer L.L.P.

(57) ABSTRACT

A bladder and attachment member assembly for use with a container comprises an elastomeric gas-filled bladder comprising a valve stem. A first attachment member is disposed over the valve stem within the container with the bladder. A second attachment member is disposed over the valve stem and over the first attachment member. The second attachment member is outside of the container interposed between the valve stem and a container opening. Rotational movement of the valve stem is fixed relative to one or both of the first and second attachment members. In an example, the valve stem comprises one or more surface features that register with one or more surface features of the first and/or second attachment member to thereby fix relative valve stem rotational movement. In an example, the valve stem surface feature is a flat surface that registers with a flat surface of the second attachment member inside diameter.

19 Claims, 6 Drawing Sheets

Related U.S. Application Data continuation of application No. 14/108,278, filed on Dec. 16, 2013, now Pat. No. 9,982,825.

(52) U.S. Cl.
CPC .......... *F15B 2201/4155* (2013.01); *F15B 2201/615* (2013.01); *Y10T 137/0486* (2015.04); *Y10T 137/3118* (2015.04)

(58) Field of Classification Search
CPC ......... F17C 2201/018; Y10T 137/3118; Y10T 137/0486
See application file for complete search history.

(56) References Cited

U.S. PATENT DOCUMENTS

| | | | |
|---|---|---|---|
| 3,593,746 | A | 7/1971 | Allewitz et al. |
| 3,731,843 | A | 5/1973 | Anderson, Jr. |
| 3,741,692 | A | 6/1973 | Rupp et al. |
| 3,774,802 | A | 11/1973 | O'Cheskey |
| 4,317,472 | A | 3/1982 | Zahid |
| 4,355,662 | A | 10/1982 | Floyd |
| 4,475,712 | A | 10/1984 | DeJager |
| 4,491,152 | A | 1/1985 | Neff |
| 4,628,964 | A | 12/1986 | Sugimura et al. |
| 4,778,150 | A * | 10/1988 | Pratt .............. F16K 41/043 251/274 |
| 8,256,467 | B1 | 9/2012 | Larson et al. |
| 9,982,825 | B2 | 5/2018 | Young |
| 2012/0042976 | A1* | 2/2012 | Toledo ................. F15B 1/08 138/31 |
| 2013/0193356 | A1 | 8/2013 | Collison et al. |

OTHER PUBLICATIONS

International Preliminary Report on Patentability dated Jun. 21, 2016 in corresponding International Application No. PCT/US2015/014907 filed Feb. 6, 2015; total 8 pages.
Non-Final Office Action dated Jun. 22, 2016 in corresponding U.S. Appl. No. 14/108,278, filed Dec. 16, 2013; total 15 pages.
Final Office Action dated Oct. 19, 2016 in corresponding U.S. Appl. No. 14/108,278, filed Dec. 16, 2013; total 13 pages.
Non-Final Office Action dated May 17, 2017 in corresponding U.S. Appl. No. 14/108,278, filed Dec. 16, 2013; total 14 pages.
Notice of Allowance dated Jan. 26, 2018 in corresponding U.S. Appl. No. 14/108,278, filed Dec. 16, 2013; total 7 pages.
Non-Final Office Action dated Oct. 11, 2019 in corresponding U.S. Appl. No. 15/990,529, filed May 25, 2018; total 11 pages.
Final Office Action dated Feb. 28, 2020 in corresponding U.S. Appl. No. 15/990,529, filed May 25, 2018; total 15 pages.
Advisory Action dated May 5, 2020 in corresponding U.S. Appl. No. 15/990,529, filed May 25, 2018; total 2 pages.
Non-Final Office Action dated Jun. 19, 2020 in corresponding U.S. Appl. No. 15/990,529, filed May 25, 2018; total 7 pages.
Final Office Action dated Nov. 6, 2020 in corresponding U.S. Appl. No. 15/990,529, filed May 25, 2018; total 6 pages.
Advisory Action dated Jan. 12, 2021 in corresponding U.S. Appl. No. 15/990,529, filed May 25, 2018; total 3 pages.
Non-Final Office Action dated Feb. 17, 2021 in corresponding U.S. Appl. No. 15/990,529, filed May 25, 2018; total 9 pages.
Non Final Office Action dated Jun. 15, 2021 in corresponding U.S. Appl. No. 15/990,529, filed May 25, 2018; total 8 pages.
Final Office Action dated Nov. 5, 2021 in corresponding U.S. Appl. No. 15/990,529, filed May 25, 2018; total 8 pages.
Notice of Allowance dated Jan. 25, 2022 in corresponding U.S. Appl. No. 15/990,529, filed May 25, 2018; total 8 pages.

* cited by examiner

BLADDER SURGE SUPPRESSOR

CROSS-REFERENCE TO RELATED APPLICATIONS

This application is a continuation of U.S. patent application Ser. No. 15/990,529, filed May 25, 2018, now U.S. Pat. No. 11,339,907, which is a continuation of U.S. patent application Ser. No. 14/108,278, filed Dec. 16, 2013, now U.S. Pat. No. 9,982,825, which applications are herein incorporated by reference in their entirety.

FIELD

The present invention relates to bladders, and more specifically, to bladders that are used in surge suppressor or surge arrestor service and that are specially engineered to avoid being twisted or turned within the surge suppressor during a tightening process after installation.

BACKGROUND

Surge suppressors or surge tanks are designed to control pressure surges or transients in hydraulic transport systems such as pipelines or the like, which are created when the flow of the fluid traveling through the system is abruptly changed. Pressure transients can be either positive or negative and are potentially destructive and may result in damage to piping, pumps, instruments, fittings, or other system components in hydraulic communication with the same.

Surge suppressors have been used for years as a means for controlling pressure transients. Some surge tanks employ an elastomeric gas-filled bladder disposed therein and are well known having applications within various industries, including fire protection systems, municipal water and sewage systems, desalination facilities, fuel systems, and chemical and petrochemical facilities.

During a pump start up, for example, a high transient of pressure is created at the pump discharge. Installation of a bladder surge tank at the pump discharge absorbs the fluid from the pump until the fluid achieves steady state velocity, then the surge tank discharges the fluid into the system to balance the pressure and eliminate the pressure transient. Pressure transients may also be created where there is a sudden and abrupt cessation of liquid flow. Bladder surge tanks can eliminate the pressure transient. Bladder surge tanks also have application as a deluge surge tank where the instantaneous discharge of fluid is required in, for example, fire protection systems.

Regardless of the application, to function properly the elastomeric bladder maintains a desired precharge pressure. When the bladder is installed into a surge tank, whether it is for the first time at a manufacturing facility or subsequently in the field to replace a nonoperable bladder, it is desired that the bladder be installed in a manner that does not damage or otherwise potentially impair the desired operation and effective service life of the bladder once installed and placed into use.

It is, therefore, desired that a bladder and attachment members for installing or attaching the same within a surge tank be engineered in a manner so as to avoid the bladder from possibly being damaged during installation. It is further desired that the bladder and attachment members be ones that permit bladders to be used with existing surge tanks, e.g., be retrofitable, so as to enable use of the bladder and attachment members with existing surge tanks and thereby avoiding the need to replace the surge tank altogether. It is further desired that the bladder and/or member used in conjunction therewith be ones capable of being manufactured without having to use any exotic techniques or materials.

SUMMARY

A bladder and attachment member assembly for use with a container comprises an elastomeric gas-filled bladder comprising a valve stem extending outwardly therefrom. A first attachment member is disposed over the valve stem, the first attachment member having an inside diameter and an outside diameter. The first attachment member is disposed over a first section of the valve stem and is configured for placement within the container accommodating the bladder therein. In an example, an anti-extrusion ring is interposed between the first attachment member and an inside wall surface of the container.

A second attachment member is disposed over the valve stem and positioned over the first attachment member. The second attachment member has an inside diameter and an outside diameter, wherein the second attachment member is disposed over a second section of the valve stem. In an example, the second attachment member is positioned outside of the container adjacent a container bladder access opening, and is interposed between the valve stem and the bladder access opening.

Rotational movement of the valve stem is fixed relative to one or both of the first and second attachment members. In an example, the valve stem comprises one or more surface features that register with one or more surface features of the first and/or second attachment member. In an example, the valve stem surface feature is a flat surface that registers with a flat surface of the second attachment member inside diameter. In an example, the valve stem surface features comprise a pair of diametrically opposed flat surfaces, and the second attachment member inside diameter comprises a pair of diametrically opposed flat surfaces that register with the valve stem flat surfaces.

In an example, the bladder and attachment members are assembled with the container in the manner noted above, and a locknut is threadably engaged with a portion of the valve stem extending outwardly from the second attachment member. Constructed and assembled in this manner, the locknut is tightened to a desired torque without rotation of the stem, thereby enabling bladder installation without damage thereto and additionally helping to ensure that the desired torque on the valve stem is achieved without difficulty otherwise caused by undesired bladder rotation.

BRIEF DESCRIPTION OF THE DRAWINGS

These and other features and advantages of bladders and attachment members as disclosed herein will be better understood by reference to the following detailed description when considered in conjunction with the accompanying drawings wherein.

DETAILED DESCRIPTION

Bladders and attachment members as disclosed herein are suitable for use in bladder surge tanks and are specifically engineered to ensure that during installation of the bladder it does not become twisted within the surge tank, and thus operates to prevent and protect the bladder from undesired damage that can occur from being twisted, and also operates to ensure that a proper tightening torque is applied to the bladder to obtain a desired seal with the surge tank. Bladders as disclosed herein comprise a stem that specially engineered to engage and register with an attachment member, e.g., in the form of an end plate, that is specially configured to key with the stem to prevent stem and bladder rotation when the bladder stem is tightened and torqued to a desired amount.

Figure 1:
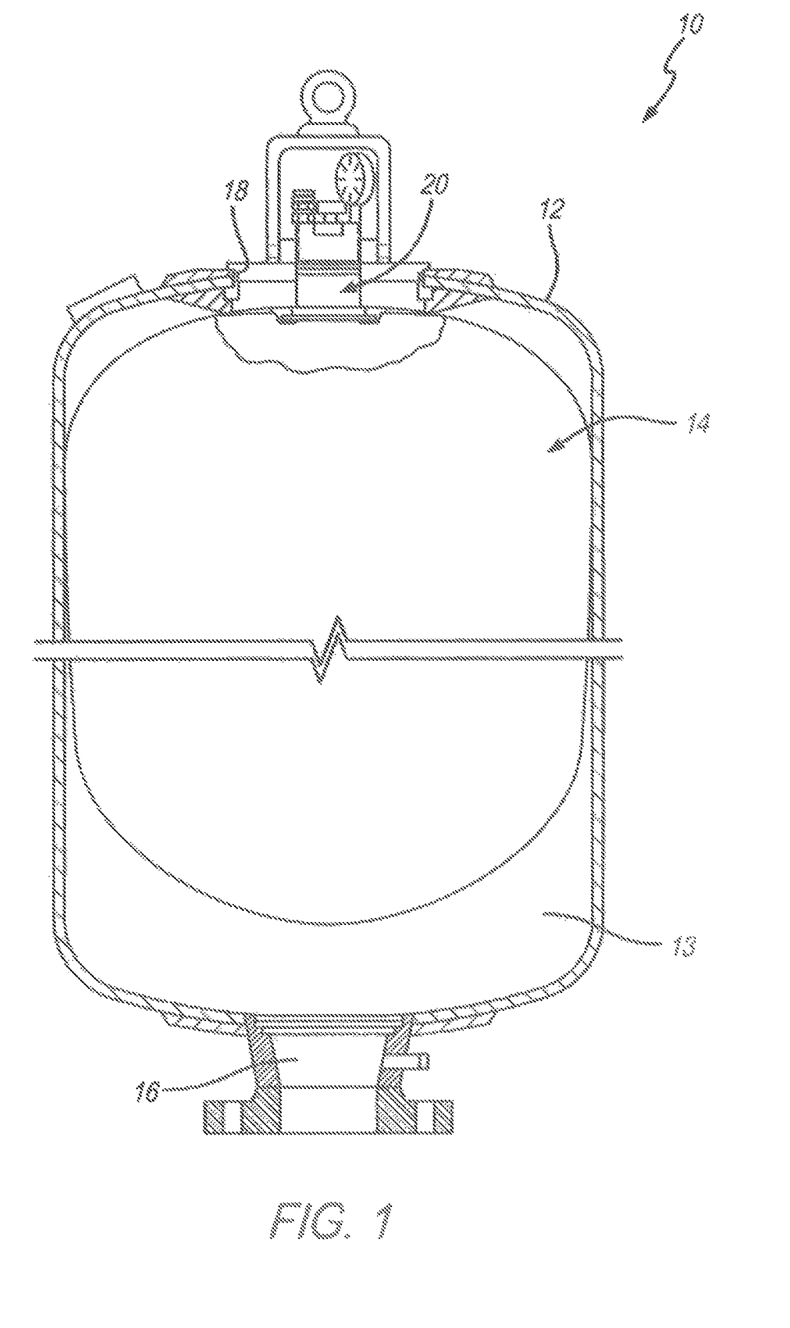
FIG. 1 is a cross-sectional side elevation of an example surge tank comprising a bladder and attachment members as disclosed herein.

FIG. 1 illustrates an example bladder surge tank 10 comprising a fluid pressure vessel or container 12 having an internal chamber 13 and a bladder 14 disposed within the chamber 13. In this particular example, the surge tank shown is one having a vertical orientation, and it is to be understood that surge tanks as disclosed herein may also include ones having a horizontal orientation. The container 12 includes a fluid inlet/outlet port 16 positioned along a bottom portion or base of the container 12. The fluid inlet/outlet opening 16 allows fluid to enter and exit the tank 10. The dimensions of the fluid inlet/outlet opening can vary depending upon the end-use application and system needs. The container includes a bladder access opening 18 disposed therethrough at one end thereof, e.g., at a top end.

Surge tanks can vary in size from 25 gallons on up, and in an example embodiment may be from about 25 to 150 gallons. However, it is to be understood that surge tanks larger that this may be used in conjunction with the bladder and attachment members as disclosed herein depending on the particular end-use application. Surge tanks may be constructed from a variety of materials, so long as the material has sufficient strength to support the load and operating pressures and is chemically resistant to the fluid being pumped. In a preferred embodiment, the material of construction is a steel material such as epoxy-coated carbon steel or stainless steel.

The bladder 14 is located within and positioned adjacent at least a partial portion of an interior wall of the chamber 12. The bladder 14 may be constructed from a variety of materials that are suitable to contain gas under pressure as well as being resistant to attack from the fluid or liquid and/or solid contents within the system. The bladder 14 must also be strong enough to withstand the pressure or force exerted upon it by an incoming fluid. In an example embodiment, the bladder 14 is made of an elastomeric material such as synthetic nitrile rubber, e.g., buna-n. The bladder includes a valve stem that is molded or otherwise attached to the bladder and that projects outwardly from a body of the bladder and through the container opening 18.

Figure 2:
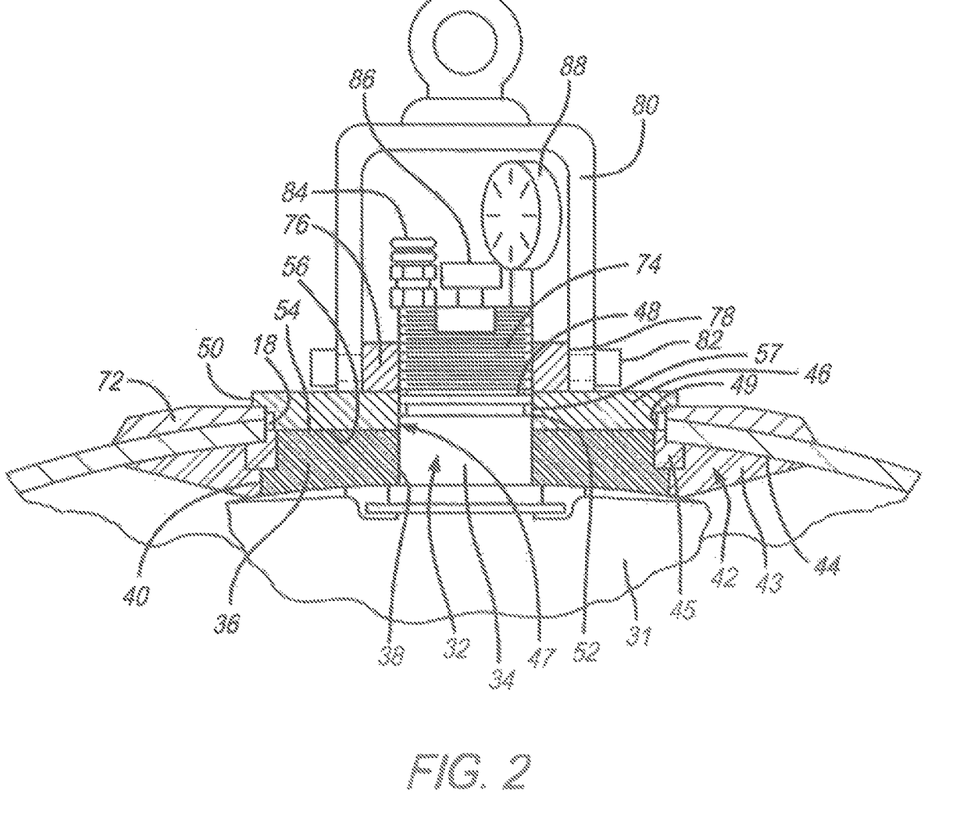
FIG. 2 is a cross-sectional side elevation of a portion of the surge tank of FIG. 1 illustrating a point where the bladder is attached to the surge tank.

FIG. 2 illustrates a close-up view of a section of the tank 30 that includes the bladder access opening 18. The bladder 31 includes the valve stem 32 that extends through the opening 18. The bladder valve stem is made from a metallic material, and in an example embodiment is made from stainless steel, such as 304 SS. Moving upwardly from the bladder 31, the valve stem 32 includes a first section 34 that projects outwardly a distance therefrom. A first attachment member 36 in the form of a gas end plug is disposed circumferentially around the valve stem first section 34, and is positioned on top of the bladder 31. The gas end plug 36 has a circular or disc-shaped configuration with an inside diameter 38 that is sized to fit over the diameter of the valve stem first section 34. In an example, the inside diameter 38 is sized in the range of from about 60 to 70 mm, 62 to 65 mm, and in a specific example 63 to 64 mm. It is understood that the particular size of the inside diameter 38 can and will vary depending on the particular size of the surge tank and bladder used therein as called for by the specific end-use application. The gas end plug 36 has an outside diameter 40 that is sized and configured to connect with an anti-extrusion ring 42 that is disposed along the outside diameter 40.

The anti-extrusion ring 42 comprises a composite construction of a rubber material 43 that is positioned along an outside diameter and that surrounds a metallic ring 45 that is disposed along an inside diameter and molded to the rubber material. The rubber material can be the same as that used to form the bladder, and the metallic ring can be stainless steel, e.g., 304 SS. The anti-extrusion ring 42 is disposed within the container, and is interposed between an inside wall surface 44 of the container and the gas end plug outside diameter 40, wherein the rubber material 43 is positioned against the inside wall surface 44 and the metallic ring 45 is positioned against the gas end plug outside diameter to lock the gas end plug into position within the container, and thereby prevent it from being extruded outwardly through the container opening 18.

The gas end plug 36 operates to maintain the position of the bladder valve stem, and thus the bladder, a desired depth or distance from the container opening 18. In an example embodiment, the gas end plug is formed from a metallic material such as stainless steel or the like. In an example where the bladder valve stem 32 has an outside diameter of approximately 63 mm, the gas end plug 36 is sized having an outside diameter of from about 193 to 194 mm, and having an axial thickness of from about 29 to 30 mm. In an example, the portion of the valve stem first section 34 that is disposed within the gas end plug is cylindrical.

Moving upwardly along the bladder valve stem 32, a second attachment member 46 in the form of a gas end plate is positioned circumferentially around the valve stem first section 34 and is disposed on top of or above the gas end plug 36. The gas end plate 46 has a specially configured inside diameter 47 that is engineered to fit around a remaining portion of the valve stem first section 34 and a valve stem second section 48 extending axially therefrom. The gas end plate 46 has an outside diameter 50 that is configured for placement on top of the opening 18 and covers the opening by a desired degree. An O-ring seal 52 is interposed between the bladder stem 32 and the gas end plate inside diameter 47. The gas end plate 46 has an outside diameter that is configured to accommodate placement of an O-ring seal 49 thereagainst, which O-ring seal is interposed between the gas end plate and the container opening 18 to provide a leak tight seal. Additionally, the gas end plug 36 has a planar top surface 54 for accommodating placement thereover with a planar bottom surface 56 of the gas end plate 46. In an example embodiment, a small gap exists between the adjacent surfaces of the gas end plug and the gas end plate, e.g., of 1/16 in. If desired, a backup ring 57 may be disposed in a groove on the valve stem first diameter section 34 and interposed between the bladder stem 32 and the gas end plate 46.

The gas end plate 46 can be formed from the same or different type of metallic material as the gas end plug, and in example embodiment is formed from stainless steel such as 304 SS. In an example where the bladder valve stem has an outside diameter of approximately 63 mm, the gas end plate is sized having an outside diameter 50 of from about 203 to 204 mm, and having an axial thickness of from about 21 to 22 mm.

Figure 3:
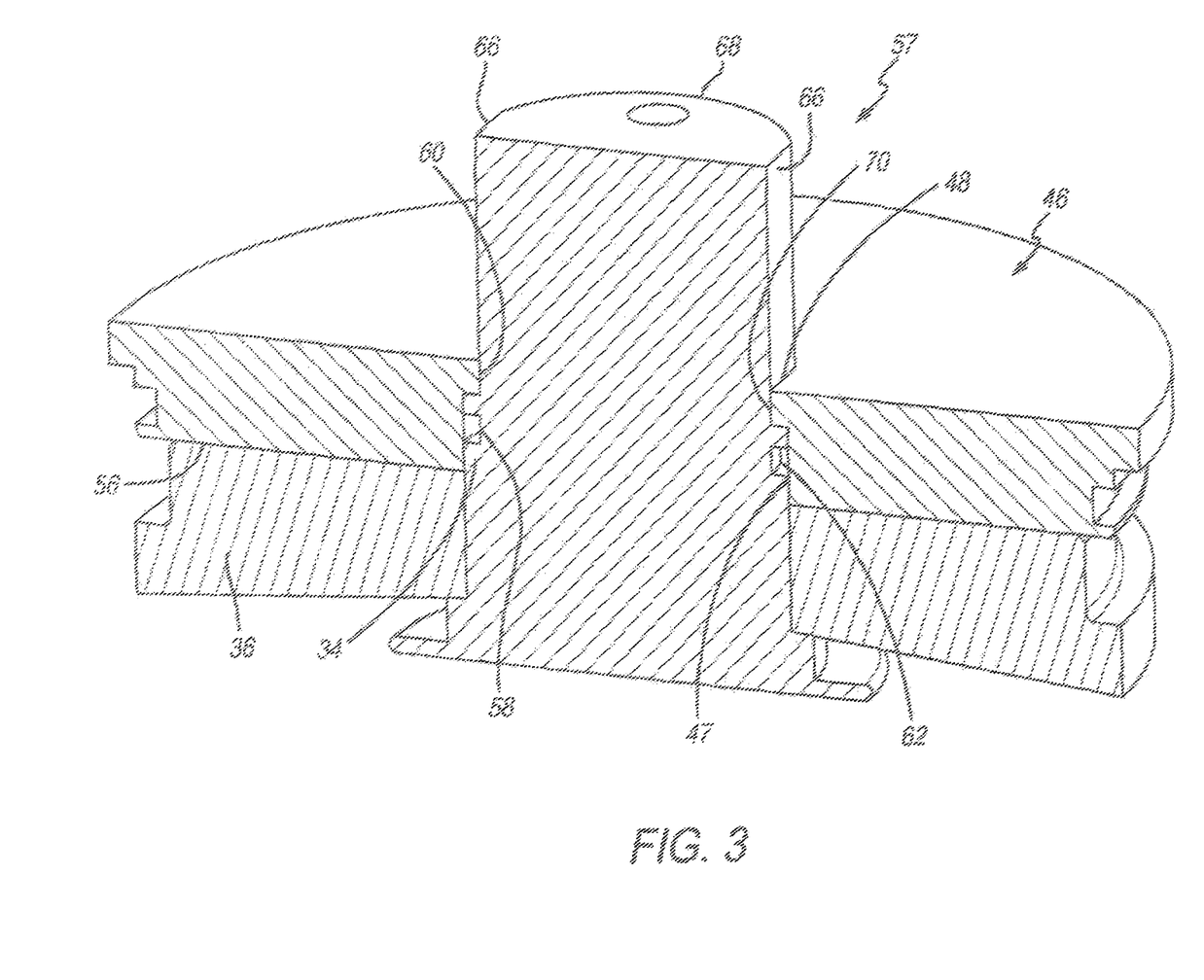
FIG. 3 is a cross-sectional side perspective view an example bladder valve stem and attachment members as disclosed herein.

FIG. 3 illustrates further the bladder valve stem and attachment member assembly 57 as disclosed herein. The gas end plate 46 inside diameter 47 is configured having a first section 58 that extends axially away from the bottom surface 56, and a second section 60 that extends axially away from the first section 58. In an example, the inside diameter first section 58 is configured having a cylindrical shape and having an inside diameter that is the same as the inside diameter of the gas end plug 36. The inside diameter first section 58 extends axially a distance that is about ½ to ¾ of the gas end plate thickness, and is disposed around the remaining portion of the valve stem first section 34. As illustrated, this remaining portion of the valve stem first section 34 comprises an internal groove 62 disposed therein to accommodate an O-ring seal (shown in FIG. 2) that is interposed between the valve stem first diameter section 34 and the gas end plate inside diameter first section 58.

The gas end plate inside diameter second section 60 is configured having one or more surface features that are shaped and positioned to register with one or more surface features along the valve stem second section 48 to lock or otherwise place the valve stem into a fixed position relative to the gas end plate 46. In an example embodiment, valve stem second section 48 is configured having two diametrically opposed flat surfaces 66 extending therealong. In such example, the remaining portion of the valve stem second section 48 comprises cylindrical surfaces 68 that are also diametrically opposed between the flat surfaces 66. In an example, the cylindrical surface 68 have the same diameter as the valve stem first diameter section 34.

The gas end plate inside diameter second section 60 is configured in a similar manner having two diametrically opposed flat surfaces 70 that are configured to engage and register with the valve stem second section flat surfaces 66, and having two diametrically opposed cylindrical surfaces (not shown) that are configured to engage and register with the valve stem second section cylindrical surfaces 68. Configured in this manner, once placed over the valve stem, the valve stem register with and is fixedly connected with the gas end plate 46 so as to prevent rotatable movement of the valve stem and the bladder during tightening and torqueing a locknut onto the valve stem during installation, i.e., the valve stem is fixed and will not rotate relative to the gas end plate.

Figure 4:
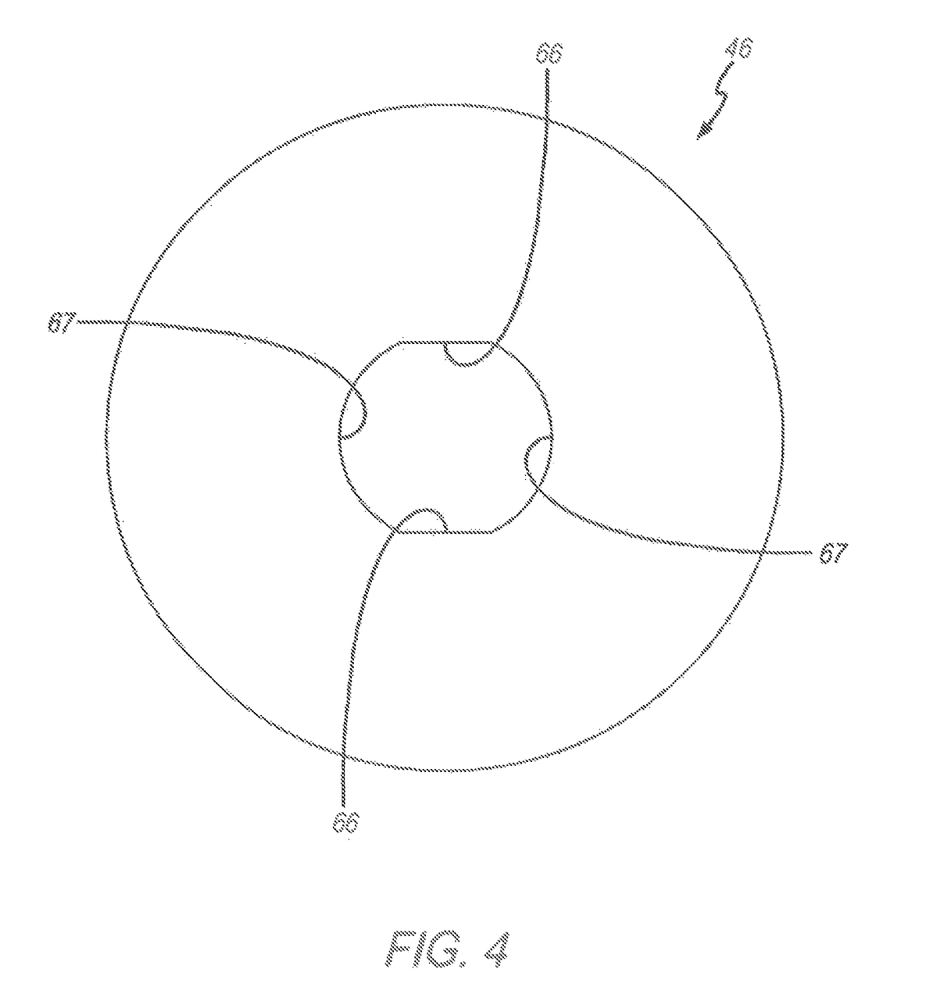
FIG. 4 is a top plan view of an attachment member as disclosed herein.
Figure 5:
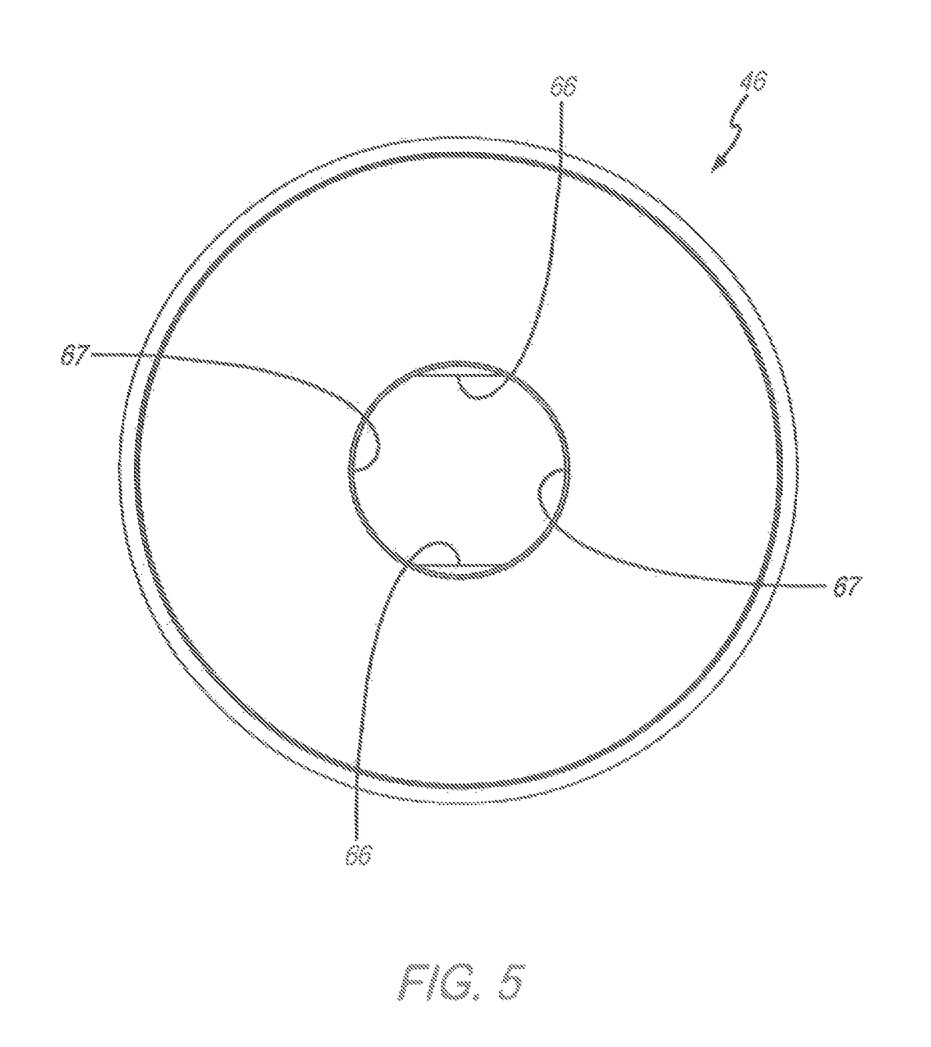
FIG. 5 is a bottom plan view of the attachment member of FIG. 4.
Figure 6:
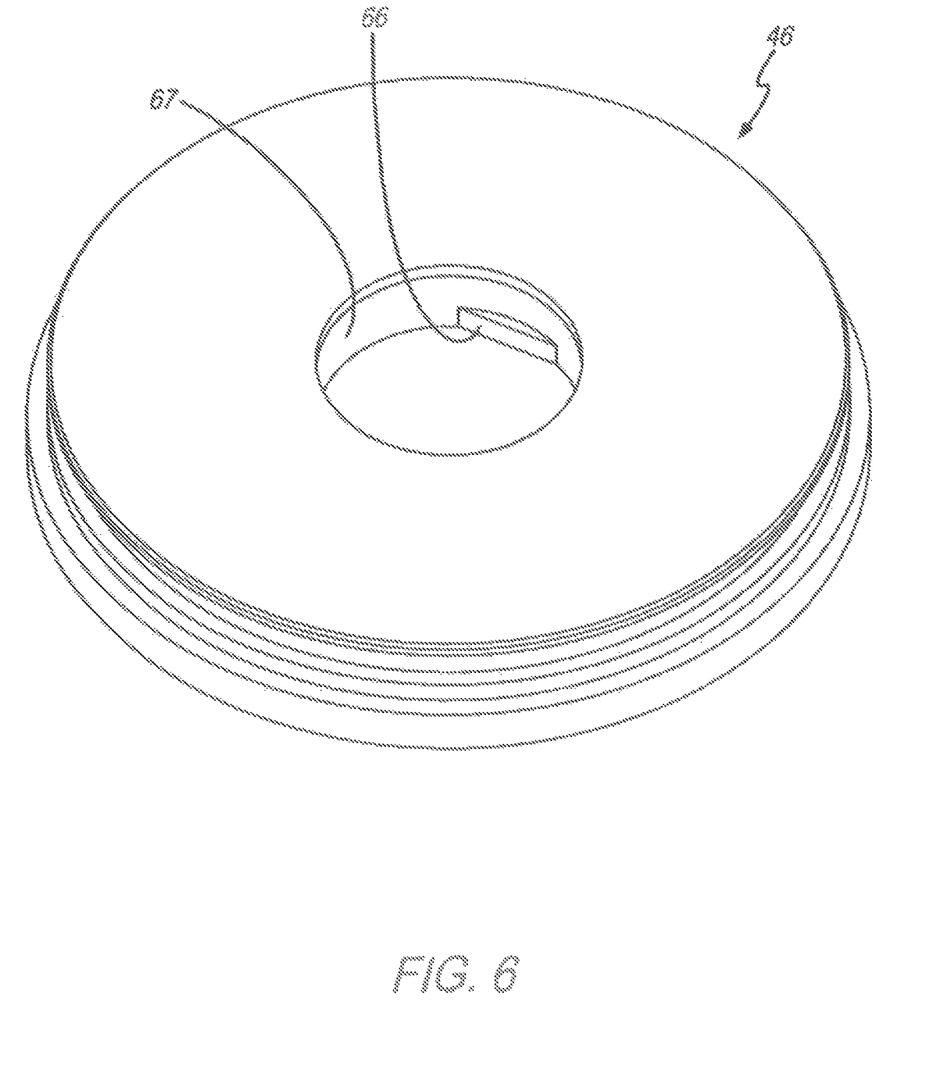
FIG. 6 is a side perspective view of the attachment member of FIGS. 4 and 5.

FIGS. 4, 5 and 6 respectively illustrate top, bottom and perspective views of the gas end plate 46 as disclosed herein comprising an inside diameter second section 60 having the opposed flat surfaces 66, and the opposed cylindrical surfaces 67.

While a particular configuration of complementary surface features between adjacent diameter sections of the gas end plate 46 and the valve stem second diameter section 48 have been disclosed and illustrated, it is to be understood that this is but one example of many different types of cooperative surface features between the valve stem and an attachment member configured to achieve the intended purpose restricting rotational movement of the bladder valve stem when tightening a locknut onto the valve stem, and that any and all such other surface features or configurations that operate to provide the same function are within the scope of bladders and attachment members as disclosed herein.

Further, while the example disclosed above and illustrated comprises a specific means for fixing the position of the valve stem relative to an attachment member so that it does not rotate relative thereto, it is to be understood that means other than that specifically described can be used. For example, the gas end plug may be configured to register with the valve stem so as to prevent rotational movement of the stem relative to the gas end plug, and one or both of the gas end plug and gas end plate may include one or more surface features that register with one another to lock together with one another, thereby operating to fixing rotational movement of the valve stem relative to the gas end plate. In such example, the adjacent top and bottom surfaces of the respective gas end plug and gas end plate may include surface projections that fit within recessed portions, or other mechanical feature, that when engaged together operate to provide a locking non-rotatable engagement relative to one another. This is but one example of how other embodiments of the bladder and attachment members may be configured within the scope of the disclosure to prevent rotation of the valve stem during tightening and torqueing of the locknut.

Referring back to FIG. 2, a reinforcing pad 72 formed from a metallic material is attached to the top surface of the container and surrounds the container opening. In an example, the reinforcing pad 72 is welded along its inside and outside diameters to the container and operates to provide reinforcement to the container adjacent the opening and is in contact with an outside diameter section of the gas end plate. Moving upwardly from the gas end plate 46, the valve stem includes a third diameter section 74 that extends axially away from the second diameter section 48 and the gas end plate 46 that is threaded for the purpose of accommodating threaded engagement and communication with a threaded locknut 76.

In an example, the locknut 76 is has an outside diameter that is configured to cooperate with a tightening member or device for purposes of turning the locknut about the valve stem and tightening the locknut to a desired torque, which in an example embodiment can be from about 500 to 505 foot lbs. In an example, the locknut 76 is configured with an outside diameter having a generally cylindrical shape except for a pair of diametrically opposed flat surfaces 78. The flat surfaces 78 enable tightening the locknut with a complementary tool such as an appropriately sized open end wrench or the like. While a particular configuration of the locknut outside diameter has been disclosed and illustrated, it is to be understood that this is but one example of many different types of outside diameter surfaces that may be used to achieve the purpose enabling grasping and tightening of the locknut onto the valve stem, and that all such other surface features or configurations are intended to be within the scope of bladders and attachment members as disclosed herein.

A valve guard 80 is disposed over the valve stem and locknut and is fixedly attached to the locknut by a number of screws 82 or the like that are tightened to make contact with the locknut flat surfaces 78. In an example, four screws 82 are used. The valve guard 80 is a U-shaped member that extends over the remaining portions of the valve stem and operates to protect the same from being damaged, wherein the remaining portions extend upwardly from the valve stem third diameter section 74 and include a gas valve 84, a pipe plug 86, and a pressure gauge 88.

Bladders and attachment members as disclosed above and illustrated are specially configured to enable installation and tightening of the bladder valve stem within the surge tank in a manner that both avoids unwanted twisting of the valve stem during tightening that could lead to an unwanted tear or other damage to the bladder, e.g., at the point of molding the stem to the bladder. Further, by providing an assembly capable of keeping the bladder valve stem in a fixed position during the tightening process it better enables one to tighten the valve stem locknut to a desired torque, thereby making it easier to obtain the desired torque on the locknut. Thus, the bladder and attachment members as disclosed herein operate to: (1) lock the valve stem in location relative to the gas end plate and gas end plug; (2) prevent rotation of the bladder during torqueing of the locknut; (3) allows for a more accurate torqueing of the locknut; (4) maintains all features of existing bladder surge suppressors; and (5) are compatible to permit retrofitable use with existing surge suppressors.

The above-described example embodiment of bladders and attaching members as disclosed herein are merely descriptive of the principles and concepts and as such are not to be considered limiting. The scope of bladder and attaching members as disclosed herein instead shall be determined from the scope of the following claims including their equivalents.

What is claimed is:

1. An attachment assembly used for fixing rotational movement of an elastomeric bladder that is disposed in a container, the attachment assembly comprising:
    a first attachment member having disc-shaped configuration with a central opening configured to accommodate placement of a valve stem of the elastomeric bladder therethrough, the first attachment member configured to be disposed within the container with a bottom-most surface in contact with a portion of the bladder or the valve stem; and
    a second attachment member having a disc-shaped configuration with a central opening configured to accommodate placement of a portion of the valve stem extending from the first attachment member therethrough, the second attachment member configured for placement outside of the container, the second attachment member having a bottom-most surface that is planar and configured to connect with the first attachment member only along a top-most planar surface of the first attachment member through an opening in the container, and wherein the second attachment member includes an outer diameter section that extends radially from a top-most surface of the second attachment member and that has an outer diameter sized larger than an inside diameter of the container opening;
    wherein at least one of the first attachment member central opening and second attachment member central opening includes a surface feature configured to register with a surface feature along an outer surface of the valve stem to fix rotational movement of the bladder relative to one or both of the first attachment member and second attachment member.

2. The attachment assembly as recited in claim 1, wherein each of the first attachment member and the second attachment member is in the form of a unitary one-piece construction.

3. The attachment assembly as recited in claim 1, wherein the first attachment member includes an outer diameter section that extends from the first attachment member top-most surface and that has an outer diameter that is sized smaller than the inside diameter of the container opening.

4. The attachment assembly as recited in claim 1, wherein the valve stem surface feature is in the form of a flat section extending along a portion of the valve stem outer surface.

5. The attachment assembly as recited in claim 1, wherein the at least one of the first attachment member central opening and second attachment member central opening surface feature is in the form of a flat section extending along a portion of the central opening.

6. The attachment assembly as recited in claim 1 further comprising a threaded nut that is configured to threadably engage a portion of the bladder valve stem extending from the second attachment member central opening for attaching the valve stem within the container by tightening the threaded nut onto a top-most surface of the second attachment member that is disposed outside of the container.

7. An attachment assembly for attaching an elastomeric bladder disposed in a container to the container and fixing rotational movement of the elastomeric bladder, wherein the container includes an opening and the attachment assembly comprises:
    a first attachment member having a unitary one-piece construction with a central opening configured to accommodate placement of a first portion of a valve stem therethrough that extends from the elastomeric bladder, wherein the first attachment member is configured to be disposed within the container against the bladder or valve stem, wherein the first attachment member has an outer diameter section adjacent a top-most surface of the first attachment member that is sized smaller than the container opening, and wherein at least a portion of the first attachment member outer diameter section is configured for placement within the container opening; and
    a second attachment member having a unitary one-piece construction with a central opening configured to accommodate placement of a second portion of the valve stem therethrough extending axially from the first attachment member central opening, the second attachment member having a top-most surface with an outside diameter configured for placement outside of the container and having an outer diameter sized greater than an inside diameter of the container opening, the second attachment member having a bottom-most surface configured to connect with the first attachment member only along the first attachment member top-most surface through the container opening;
    wherein one or both of the first attachment member central opening and second attachment member central opening includes a sidewall having a flat surface section configured to register with a flat surface section of the valve stem first portion or second portion to fix rotational movement of the bladder relative to one or both of the first attachment member and second attachment member.

8. The attachment assembly as recited in claim 7, wherein the second attachment member central opening comprises the flat section.

9. An attachment assembly for use with an elastomeric bladder to attach and contain the elastomeric bladder within a fluid or gas container, the attachment member assembly comprising:
    a first attachment member having a central opening that is sized to accommodate placement of a valve stem of the elastomeric bladder therein, the first attachment member configured to be disposed within the container, and having a planar top-most surface and having a bottom-most surface that is opposite the top-most surface and that is configured to contact at least a portion of the bladder or bladder valve stem, wherein the first attachment member includes a first outside diameter section extending axially a partial distance from the top-most surface to a second outside diameter section that extends axially to the bottom-most surface, wherein the first outside diameter section has an outer diameter that is sized differently than an outer diameter of the second outer diameter section; and a second attachment member having a central opening that is sized to accommodate placement of a portion of the valve stem extending from the first attachment member therein and having a planar bottom-most surface configured to connect with the first attachment member along only the first attachment member top-most surface, and having a top-most surface that is opposite the bottom-most surface of the second attachment member, wherein the second attachment member includes a first outside diameter section that extends axially a partial distance from the second attachment member top-most surface to a second outside diameter section that extends axially towards the second attachment member bottom-most surface, wherein the second attachment member first outside diameter section has an outer diameter that is sized differently than an outer diameter of the second attachment member second outside diameter section;

wherein one or both of the first attachment member central opening and second attachment member central opening includes a surface feature that is configured to register and abut with a surface feature of the valve stem to fix rotational movement of the bladder structurally by interplay between the abutting surfaces features relative to one or both of the first attachment member and second attachment member.

10. The attachment assembly as recited in claim 9, wherein the first attachment member first outside diameter section is sized smaller than the first attachment member second outside diameter section.

11. The attachment assembly as recited in claim 10, wherein the first attachment member first outside diameter section is sized to fit within the container opening.

12. The attachment assembly as recited in claim 9, wherein the second attachment member first outside diameter section is sized larger than the second attachment member second outside diameter section.

13. The attachment assembly as recited in claim 12, wherein the second attachment member second outside diameter section is sized to fit within the container opening.

14. The attachment assembly as recited in claim 12, wherein the second attachment member first outside diameter section is sized greater than the container opening.

15. The attachment assembly as recited in claim 14, wherein the first attachment member second outside diameter section is sized smaller than the second attachment member first outside diameter section.

16. The attachment assembly as recited in claim 9, wherein the second attachment member central opening includes the surface feature that is configured to register with a complementary surface feature along an outside surface of the valve stem disposed within the central opening of the second attachment member to rotationally fix the bladder relative to the second attachment member.

17. The attachment assembly as recited in claim 16, wherein the second attachment member central opening surface feature is in the form of a flat surface.

18. The attachment assembly as recited in claim 9, wherein each of the first attachment member and second attachment member are in the form of a unitary one-piece construction.

19. A bladder surge suppressor comprising the attachment assembly of claim 9 to attach the elastomeric bladder to the container and fix rotational movement of the bladder to one or both of the first attachment member and the second attachment member.

* * * * *